(12) United States Patent
Martinez et al.

(10) Patent No.: US 8,715,411 B2
(45) Date of Patent: May 6, 2014

(54) METHOD FOR PRODUCING A CLINKER FOR HYDRAULIC CEMENT WITH LOW $CO_2$ EMISSION AND HIGH RESISTANCE

(75) Inventors: Juan Carlos Martinez, Worb BE (CH); Norma Leticia Garza Gonzalez, Guadalupe (MX); Karla Serrano Gonzalez, Monterrey (MX); Homero Ramirez Tovias, Nuevo Leon (MX)

(73) Assignee: Cemex Research Group AG, Brugg Bei Biel (CH)

( * ) Notice: Subject to any disclaimer, the term of this patent is extended or adjusted under 35 U.S.C. 154(b) by 0 days.

(21) Appl. No.: 13/704,699

(22) PCT Filed: Jun. 17, 2011

(86) PCT No.: PCT/IB2011/001376
§ 371 (c)(1),
(2), (4) Date: Feb. 26, 2013

(87) PCT Pub. No.: WO2011/158105
PCT Pub. Date: Dec. 22, 2011

(65) Prior Publication Data
US 2013/0152825 A1 Jun. 20, 2013

(30) Foreign Application Priority Data
Jun. 18, 2010 (FR) ................................. 10/02587

(51) Int. Cl.
*C04B 7/32* (2006.01)
*C04B 7/02* (2006.01)
*C04B 7/52* (2006.01)
*C04B 28/06* (2006.01)
*C04B 7/345* (2006.01)
*C04B 7/36* (2006.01)
*C04B 7/42* (2006.01)

(52) U.S. Cl.
CPC . *C04B 7/02* (2013.01); *C04B 7/323* (2013.01); *C04B 7/345* (2013.01); *C04B 7/367* (2013.01); *C04B 7/421* (2013.01)
USPC ............................. 106/693; 106/692; 106/768

(58) Field of Classification Search
USPC .......................................... 106/692, 693, 768
See application file for complete search history.

(56) References Cited

U.S. PATENT DOCUMENTS

| | | | | |
|---|---|---|---|---|
| 4,957,556 A * | 9/1990 | Kunbargi | ....................... | 106/693 |
| 6,695,910 B2 * | 2/2004 | Classen et al. | ................. | 106/739 |
| 7,850,776 B2 * | 12/2010 | Gartner et al. | ................. | 106/692 |
| 7,998,267 B2 * | 8/2011 | Gartner et al. | ................. | 106/692 |
| 8,177,903 B2 * | 5/2012 | Walenta et al. | ................. | 106/695 |
| 8,317,915 B2 * | 11/2012 | Walenta et al. | ................. | 106/695 |
| 2007/0266903 A1 | 11/2007 | Gartner et al. | | |
| 2013/0152825 A1 * | 6/2013 | Ramirez Tovias et al. | ... | 106/693 |

FOREIGN PATENT DOCUMENTS

| | | |
|---|---|---|
| CN | 100453496 A | 1/2009 |
| DE | 4204227 C1 | 2/1993 |
| WO | 2006061210 A2 | 2/2006 |

* cited by examiner

*Primary Examiner* — Anthony J Green
(74) *Attorney, Agent, or Firm* — Bachman & LaPointe, P.C.

(57) ABSTRACT

A method for producing a clinker for cement, comprising grinding a raw flour comprising, especially, $Al_2O_3$, $Fe_2O_3$ and $SO_3$ in contents such that the formula for calculating $SO_3$ content of $=0.261 \times Al_2O_3 - 0.638 \times Fe_2O_3 + k$, where $2.5 < k < 3.5$, then by sintering flour in an overn wherein the temperature is between 1250° C. and 1350° C. and oxygen content is between 2.5% and 10% by volume.

5 Claims, 3 Drawing Sheets

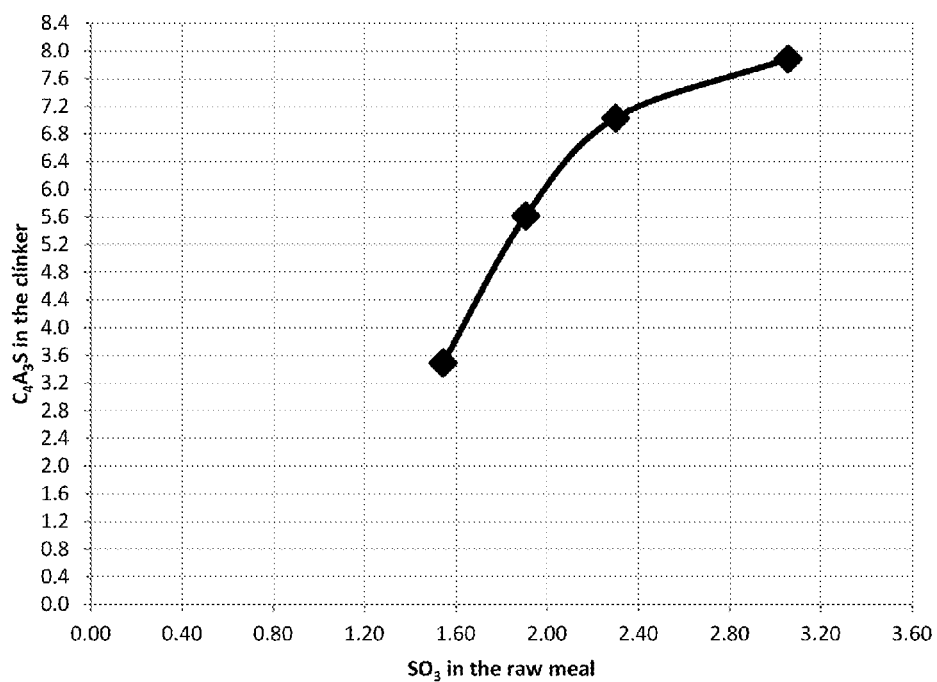

METHOD FOR PRODUCING A CLINKER FOR HYDRAULIC CEMENT WITH LOW $CO_2$ EMISSION AND HIGH RESISTANCE

FIELD OF THE INVENTION

The present invention relates to a new family of clinker produced industrially, comprising the phases alite ($C_3S$), belite ($C_2S$), calcium sulfoaluminate ($C_4A_3\underline{S}$) and calcium aluminoferrite ($C_4AF$), which, by its composition, emits a smaller amount of $CO_2$ during its manufacture than a standard Portland cement clinker, exhibits a high level of compressive strength and is suitable for the manufacture of a new family of hydraulic cements.

BACKGROUND OF THE INVENTION

The present invention relates to the manufacture of clinker in industrial kilns, during which smaller amounts of $CO_2$ are emitted, and which by its nature makes it possible to obtain a higher mechanical strength and in particular its compressive component in hydraulic cements.

Portland cement clinker is normally manufactured using an intimate pulverized mixture of limestone, clay, iron or other minor components; this mixture is exposed in a rotary kiln to temperatures of greater than 1450° C., ensuring the formation of the phases which are the source of the characteristics required for the cements. These phases are alite ($C_3S$), belite ($C_2S$), calcium aluminate ($C_3A$), calcium aluminoferrite ($C_3A$), calcium aluminoferrite ($C_4AF$) and other minor phases. Alite ($C_3S$) provides mainly the properties of strength, which normally retains values of greater than 50%, requiring in order to do this large amounts of limestone and consequently generating a high level of $CO_2$ emissions.

It is important to remember that the $CO_2$ emissions related to an industrial process for the production of clinker for Portland cement are due mainly to two phenomena: the decarbonation of the limestone, which changes from $CaCO_3$ to CaO and then to $CO_2$, and the combustion during the conversion of carbon of the latter materials into $CO_2$, effectively combined with atmospheric $O_2$. In the past, efforts have been undertaken to reduce the $CO_2$ emissions by modifying the chemical and mineralogical composition of the clinker and that of the Portland cement; these modifications have made it possible to remove the alite phase from the clinker and to significantly increase the belite content with conversion into an alternative form of clinkers and belite cements.

It is known that, with belite clinker, cement having a low reactivity and consequently having a low initial compressive strength is obtained, although, at advanced ages of 28 days and more, the strength becomes higher, without it ever being comparable to that of the cements having a high alite ($C_3S$) content.

This low compressive strength during aging makes it difficult to commercialize this type of cement since this characteristic does not meet the requirements over time of modern constructions imposed by the construction industry and does not meet the quality standards for cements.

An example of this technology for the production of belite cements is described in U.S. Pat. No. 5,509,962 of Apr. 23, 1996, in which Fluvio J. Tang describes the method for the production of a cement mainly composed of α-belite, the more reactive category of belite which is not generally encountered in cements produced under normal conditions. Tang shows in this patent how the use of Na, K and Fe ions makes it possible to activate and fix this category of belite, while attempting to improve the initial strength of the belite cements.

Another example is represented by British patent GB 2 013 648 of Aug. 15, 1979, entitled "Process for the manufacture of cement", in which Richard Schrader explains how, by using the same process for the production of Portland cement and with an appropriate formulation of raw meal, which normally employs a smaller amount of limestone matter ($CaCO_3$), a β-ferrite clinker is obtained at a temperature as low as 1350° C., the belite of which clinker is activated according to an appropriate cooling technique.

Sulfoaluminate-based cements are the fruit of efforts made by scientists and technologists to find an alternative to Portland cements. Cements of this type are composed mainly of the $C_4A_3\underline{S}$ (calcium sulfoaluminate) phase replacing the $C_3A$ and $C_3S$ phases in the clinker and the cement and reducing the emission of $CO_2$. Generally, the proportion of $C_4A_3\underline{S}$ in clinkers of this type exceeds 40%, requiring starting materials rich in alumina and sulfates in order to be able to form said phase. Even if it is certain that materials having a high sulfate ($SO_4$) content are commonplace, as in gypsum, anhydrite and other materials, alumina-rich starting materials are unusual and can be regarded as special, resulting in a high cost of supplying; bauxite is an example of this. In addition, deposits are not homogeneously distributed geographically.

Clinker and cement of this type use less $CaCO_3$, due to its composition and to its special formulation, resulting in a significant decrease in the $CO_2$ emissions, which can nevertheless reach 50% during the decarbonation process, as a function of the starting materials used and of their formulation.

Cement of this type has the distinguishing feature of exhibiting a high initial strength due to the formation of large amounts of ettringite ($C_6A\underline{S}H_{32}$). However, as it is manufactured under special cost and production conditions, the employment thereof has been reserved for special uses, such as repairs and pavings.

Another characteristic of these cements is the temperature level at which they are manufactured. As this temperature is less than 1300° C., energy consumption is thus lower, therefore reducing the $CO_2$ emissions.

Some examples of this manufacturing technology are disclosed in U.S. Pat. No. 6,149,724, of Nov. 21, 2000, and U.S. Pat. No. 7,150,786, of Dec. 19, 2006. In these documents, Ulibarri and Kunbargi present us respectively with their processes for the manufacture of cements having high proportions of calcium sulfoaluminate ($C_4A_3\underline{S}$), with a low proportion of belite ($C_2S$) and, for Ulibarri, at least 1% alite ($C_3S$), in order to obtain a high initial strength during the reaction of the calcium sulfoaluminate $C_4A_3\underline{S}$ in order to form ettringite ($C_6A\underline{S}H_{32}$), which also reduces the setting time. This cement is often used as a mixture with Portland cement in different proportions in order to improve its role.

In both the abovementioned cases, use is made of special starting materials, that is to say materials which do not require a plant for producing the Portland clinker or at least in amounts recommended by these inventors. Under these conditions, starting materials having very high alumina ($Al_2O_3$) contents are necessary, which materials are generally rare and of economic value, resulting in a very high cost for the production of cements of this type.

In recent years, another group of scientists has developed novel cements using technologies (belite and sulfoaluminate cements) described above in this document, in order to improve the role of belite cements, and also the perception on the market of the production of cements of this type having a slow change in the compressive strength.

Another example of this case is represented by United States patent application US 2007/0266903, of Nov. 22, 2007, in which Ellis Gartner shows us how a belite cement, prepared with a clinker manufactured at a temperature of between 1150 and 1350° C., composed mainly of α-belite devoid of alite ($C_3S$) and the formulation of which uses a series of minor components, is improved by mixing it with calcium sulfoaluminate ($C_4A_3\bar{S}$). In this case, this component is incorporated in order to activate the belite and to increase the initial strength, which is normally very low when only a belite cement is used.

SUMMARY OF THE INVENTION

The aim of the present invention is to solve the technical problems posed by the previous clinker compositions by providing a process for the industrial manufacture of this novel clinker and of a cement having a high content of alite (alite cements) and of calcium sulfoaluminate, while resorting to starting materials generally employed by plants for the production of Portland cement.

The cement of the invention is composed of alite ($C_3S$) in a proportion of 30% to 70% by weight, of belite ($C_2S$) in a proportion of 10% to 40% by weight, of calcium sulfoaluminate ($C_4A_3\bar{S}$) in a proportion of 5% to 15% by weight and of ferrite ($C_4AF$) in a proportion of 1% to 7% by weight, for the main phases, and, if appropriate, of anhydrite ($C\bar{S}$) and of $C_3A$ for the minor phases or components.

The manufacture of this clinker and of this cement involves standard starting materials already used in plants producing Portland clinker and cement, such as limestone, clay, kaolin, gypsum, fluorite ($CaF_2$) and others. This formulation dispenses with rare materials, such as bauxite and aluminous clays, which are difficult to obtain and generally of high commercial value.

Fluorite is added in order to lower the temperature of the eutectic for the formation of liquid phases during the clinkering and to lower the energy level required. The amount of fluorite is between 0.1% and 1.5% by weight and preferably between 0.2% and 1% by weight.

The formulation of this novel clinker makes it possible to employ a reduced proportion of limestone and to have available raw meal formulations which, once calcined, generate less $CO_2$ during the decarbonation process. The temperature for sintering this clinker also decreases, since the temperatures of 1400° C.-1450° C. normally used to manufacture Portland clinker are lowered to between 1250° C. and 1350° C. for the clinker of the invention, which reduces the amount of fuel necessary and consequently the $CO_2$ emissions.

The mechanical properties of this novel cement manufactured with the clinker of the invention improve the compressive strength at all ages of the product, from the first hours to 28 days, and it is not uncommon to observe increases in strength ranging from 25 to 50%.

The manufacture of this novel clinker involves adaptations to the operating parameters of the rotary kilns used for the preparation of the product. The regulation of the temperature in the kiln and the $O_2$ (oxygen) content of the latter are significant parameters of the process for fixing the sulfur in the clinker with the formation of calcium sulfoaluminate ($C_4A_3\bar{S}$), thus avoiding the formation of concretions in the preheater and of rings in the kiln, common phenomena if recourse has been had to sulfur-rich materials.

BRIEF DESCRIPTION OF THE DRAWINGS

FIG. 4 shows the measured concentration of $C_4A_3\bar{S}$ in the clinker (T=1300° C.; LSF=96) as a function of the SO3 concentration in the raw meal.

DETAILED DESCRIPTION OF THE PREFERRED EMBODIMENT(S)

The present invention makes it possible to bring about the coexistence of the alite ($C_3S$) and calcium sulfoaluminate ($C_4A_3\bar{S}$) phases in a clinker, in this way producing cements having a high content of alite ($C_3S$) and calcium sulfoaluminate ($C_4A_3\bar{S}$). This alite content constitutes a significant difference from the technologies of the belite cements, the sulfoaluminate cements and the combination of the two technologies, where alite does not normally exist. In the invention, the coexistence of the alite and sulfoaluminate phases is possible by virtue of a rigorously controlled production process.

The starting materials employed for the production of this novel clinker are commonly available in cement works where conventional Portland grey clinker is manufactured and in their supply quarries. These starting materials generally comprise limestone ($CaCo_3$), clay, kaolin or any material comprising $SiO_2$ and $Al_2O_3$, and also a sulfur-comprising material necessary for the formation of the calcium sulfoaluminate phase, namely gypsum, natural anhydrite, ash from gas desulfurization, waste from the hydrofluoric acid industry, and the like. The proportion of the constituent materials of the raw meal is defined from the control moduli specific to the clinker, namely the lime saturation factor (LSF), of between 91 and 96, the silica modulus (SM), of between 2.0 and 5.0, and the alumina modulus (AM), of between 2.7 and 22, and depends strongly on the iron content of the materials employed.

Figure 1:
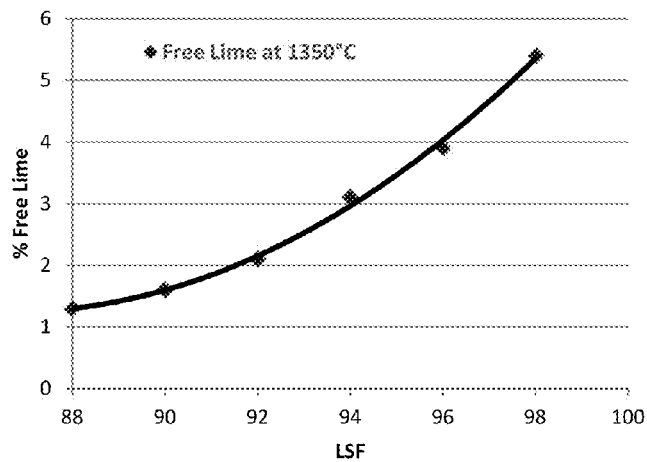
FIG. 1 shows the concentration of free lime (CaO) measured in the clinker as a function of the value of the Lime Saturation Factor (LSF) at 1350° C. in normal OPC clinker.

The value of the lime saturation factor has a direct effect on the free calcium oxide content of the clinker due to the thermal energy required for the formation of the mineralogical phases in which the calcium ions are combined with silica, alumina and iron, as illustrated in FIG. 1.

The process for the formulation of the raw meal according to the invention makes it possible to reduce both the amount of limestone and the amount of fuels since the temperature at which the clinker is sintered is of the order of 1250° C. to 1300° C., resulting in a sharp reduction in the $CO_2$ emissions.

An essential element of the formulation of the raw meal is the $SO_3$ content: the latter is determined from stoichiometric calculations in which the amount of aluminum is considered to be equal to the total amount of aluminum available for the formation of the calcium sulfoaluminate, namely the amount capable of reacting with the iron oxide, to which is added an additional factor representing a slight excess of $SO_3$ in the clinker which is intended to improve both the stabilization of the calcium sulfoaluminate and the achievement of a low content of free lime. The formula (A) for calculating the content of $SO_3$ available in the raw meal and in the fuel is written according to the equation:

$$SO_3 = 0.261 \times Al_2O_3 - 0.638 \times Fe_2O_3 + k, \text{ with } 2.5 < k < 3.5$$
and preferably $2.75 < k < 3.25$.

In the raw meals under consideration, the $Fe_2O_3$ and $Al_2O_3$ contents are within the following respective ranges (the % being by weight) from 0.5% to 2% and from 3% to 10%.

The process for the production of the clinker comprises: grinding the raw meal, feeding the kiln, precalcining and sintering the raw meal, cooling the clinker and grinding the cement.

Figure 2A:
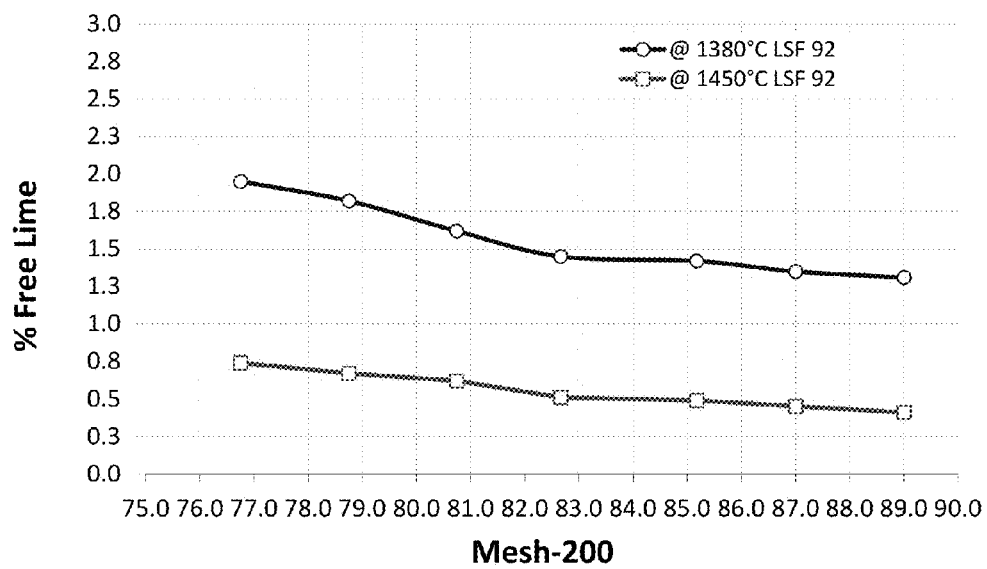
FIG. 2a shows the concentration of the free lime (CaO) measured in the clinker for LSF=92 at two clinkerization temperatures (1450° C. and 1380° C.), as a function of the raw meal finesness (retained on mesh 200)
Figure 2B:
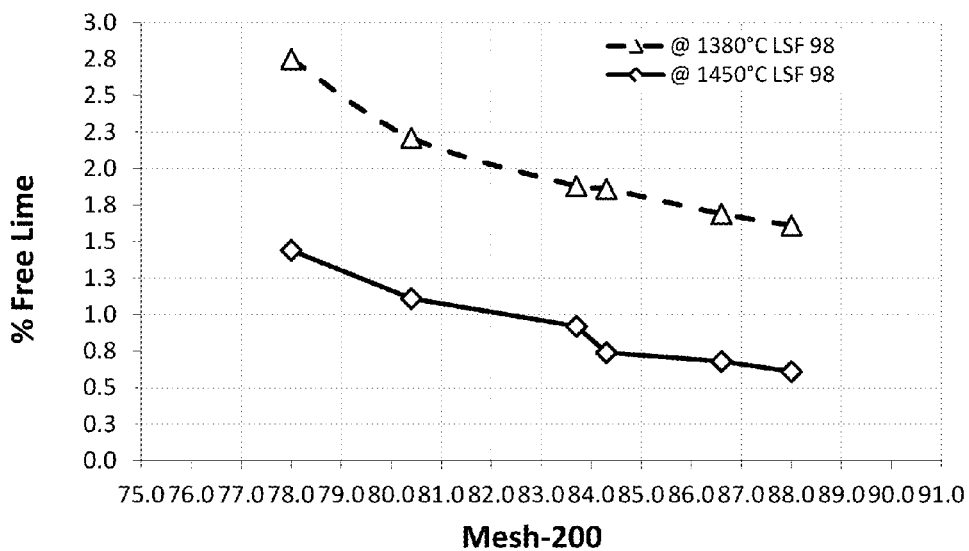
FIG. 2b shows the concentration of the free lime (CaO) measured in the clinker for LSF=98 at two clinkerization temperatures (1450° C. and 1380° C.), as a function of the raw meal fineness (retained on mesh 200)

The grinding of the raw meal consists in introducing the precrushed and mixed materials into the mill in appropriate proportions, making it possible to obtain particles to be retained on a 200 sieve, in order to optimize the combustion in the kiln, that is to say the conversion of all of the calcium oxide into calcium silicate and calcium aluminate mineralogical phases. The value of the LSF influences the degree of combustion of the crude product, as is shown in FIGS. 2A and 2B.

During the feeding of the preheating tower with raw meal, it is necessary to control the temperature in order to facilitate the process of decarbonation of the limestone material included in the starting material while maintaining the evaporation of the volatile components (mainly $SO_3$) at the same level and without impeding the operation of the kiln by deposits in the pipes of the preheater or inside the kiln. The control of the evaporation of $SO_3$ in the kiln is the key to a stable and continuous operation. The control of the evaporation rests on the monitoring of the material retained in the fourth stage of the preheater, in which zone the volatile materials have a tendency to be concentrated (namely $SO_3$, $Na_2O$ and $K_2O$). The loss by combustion of the said material is determined and the evaporation of the $SO_3$ in the kiln is calculated by the following formulae:

$$\text{Evaporation of } SO_3 \text{ in the kiln} = (SO_{3\,IB} - SO_{3\,CLK}) / SO_{3\,IB}$$

$$SO_{3\,IB} = SO_3 \text{ igneous base} = SO_{3\,IV} \times (100/(100 - L \cdot Ign_{IV}))$$

where $SO_{3\,CLK}$ is the material retained in the clinker and $L.Ign_{IV}$ is the loss by combustion determined at 950° C. in the material of the fourth stage of the preheater.

As described, the $SO_3$ content of the raw meal plays a predominant role in the invention. An insufficiency of available $SO_3$, as is shown in examples 4 and 5 as a function of the $Al_2O_3$ and $Fe_2O_3$ contents, will be reflected, on the one hand, by an increase in the free lime CaO in the clinker, which, according to the general practice with regard to quality, should not be greater than 1.5%, and, on the other hand, does not promote the formation of the desired levels of calcium sulfoaluminate.

The clinkers according to the invention are thus characterized by an $SO_3$ excess according to the equation (A) which makes it possible to guarantee the formation of the optimum amounts of calcium sulfoaluminate while maintaining, in the final clinker, an amount of anhydrite $CaSO_4$ of between 3% and 10% by weight, according to the content of calcium sulfoaluminate capable of being formed as a function of the $Al_2O_3$ and $Fe_2O_3$ contents of the raw meal.

A controlled excess of available $SO_3$ makes it possible to promote the presence of $CaSO_4$ (anhydrite) in the final clinker with respective contents of 3% to 10% by weight, which exhibit several advantages:

An excess of $SO_3$ in the form of $CaSO_3$ in the raw meal or during the clinkering (sintering) makes it possible to maintain an excellent low-temperature industrial operability by promoting the mineralization of the mixture and by maintaining good fluidity and good viscosity of the liquid phase which is formed, making it possible to thus obtain a homogeneous final clinker and to prevent any problem of transportation of the material in the treatment kiln.

The anhydrites which are formed at temperatures lying above 800° C. exhibit an allotropic form which is sparingly soluble in water. The presence of the anhydrites thus makes it possible to more easily regulate the additions of sulfur which are necessary to form cement from the clinker, by acting as setting regulators.

Conversely, the $SO_3$ content is an essential element of the raw meal of the clinker but excessively high values are harmful to the mechanical properties of the cements produced, in particular by reducing the mechanical compressive strengths at 1 day and 7 days.

The evaporation has to be controlled, care being taken that it does not fall, for example, below 40%, in order to prevent losses of sulfur.

In addition to the temperature, the oxygen content of the kiln is another critical parameter to be controlled in order to prevent problems of deposition or of formation of sulfur rings. An appropriate oxygen content of the kiln which facilitates complete combustion and a strongly oxidizing atmosphere, in which the $SO_3$ can be retained in the clinker and extracted from the kiln, typically lies between 2.5% and 10% by volume in the atmosphere of the kiln and preferably between 4% and 8%.

Unlike the conventional process for the production of clinker, in order to obtain the product provided in the present invention, it is necessary to control the sintering or clinkering temperature by acting on the content of $SO_3$ retained, the content of free lime and the mineralogical composition of the clinker.

The calcium sulfoaluminate is formed within a temperature range of between 1000° C. and 1250° C., in which CaO, $Al_2O_3$ and $CaSO_4$, present in the system, are combined and react. The presence of the calcium sulfoaluminate is monitored solely in the laboratory by X-ray diffraction on the clinker produced, in order to confirm that the alumina determined in the chemical analysis is combined in the relevant mineralogical phase. If the temperature is insufficient, the $Al_2O_3$ is stabilized as calcium aluminate ($C_{12}A_7$) at approximately 1000° C. and not as calcium sulfoaluminate, the reactive phase for the development of the compressive strength at the advanced ages of the material, and the $SiO_2$ is stabilized as belite and not as alite. In the case where the temperature is greater than 1250° C.-1300° C., the $SO_3$ evaporates on breaking up into $C_3A$ in the $C_4A_3S$.

The clinker obtained comprises between 30% and 70% of $C_3S$, 10% and 40% of $C_2S$, 4% and 30% of $C_4A_3S$ and 5% and 15% of $C_3A$ and between 1% and 7% of $C_4AF$ and from 3% to 10% by weight of $CaSO_4$ (anhydrite). Consequently, unlike other clinkers obtained at low temperature comprising the calcium sulfoaluminate active phase, the present invention contributes to the formation of an alite clinker.

EXAMPLES

Example 1

The composition of a clinker comprising a low carbon content comprises 73% limestone and 22% kaolin, in addition to agents which promote the formation of the clinker phases at low temperature. The chemical analysis of the clinker obtained is presented below:

| Chemical analysis | | |
|---|---|---|
| $SiO_2$ | % | 22.80 |
| $Al_2O_3$ | % | 4.80 |
| $Fe_2O_3$ | % | 0.35 |
| CaO | % | 65.28 |
| MgO | % | 0.88 |
| $SO_3$ | % | 4.18 |
| $Na_2O$ | % | 0.27 |
| $K_2O$ | % | 0.19 |
| $TiO_2$ | % | 0.25 |
| $P_2O_5$ | % | 0.06 |
| $Mn_2O_3$ | % | 0.00 |
| $CaF_2$ | % | 0.49 |
| Free CaO | % | 1.10 |
| Control moduli | | |
| LSF | | 93.6 |
| SM | | 4.4 |
| AM | | 13.7 |

Appropriate control of the sintering temperature in the rotary kiln and of its cooling, preferably by a grid heat exchanger, makes it possible to obtain the mineralogical composition of the clinker, taking as basis the Bogue equations for the potential phases:

| Phase | Unit | Value |
|---|---|---|
| Alite | % | 48 |
| Belite | % | 29 |
| Calcium sulfoaluminate | % | 9 |
| Calcium aluminate | % | 1 |
| Calcium aluminoferrite | % | 1 |
| Anhydrite | % | 5 |
| Free lime | % | 1 |

COMMENT: The $C_3A$ and $C_4A_3\overline{S}$ phases are distinguished by X-ray diffraction, which explains that the aluminum taken into account in calculating the potential phases of the $C_4A_3\overline{S}$ and $C_4AF$ is free after formation of the $C_3A$ quantified by the Rietveld method (by X-ray diffraction).

In the preparation of the cement, the $SO_3$ to be used is defined by the maximum compressive strength over 24 hours. Once determined the $SO_3$ content of the cement is 7.3% in order to obtain its optimum reactivity in this specific case, and after grinding of the material to 96% with the 325 sieve, the compressive strengths were obtained on 2" (inch) mortar cubes; the corresponding results are presented below:

| Compressive strength on 2" mortar cubes | | |
|---|---|---|
| Water/cement ratio | | 0.485 |
| 24 H | $N/mm^2$ | 17.5 |
| 3 D | $N/mm^2$ | 36.0 |
| 7 D | $N/mm^2$ | 49.1 |
| 28 D | $N/mm^2$ | 61.7 |

Example 2

By using 71.2% of limestone, 10.2% of a material rich in $Al_2O_3$, 11.5% of high-alumina kaolin and agents which promote formation of the phases of the clinker, the raw meal is obtained which, once heated at 1350° C. in a rotary kiln, produces a clinker having a low carbon content, the chemical composition of which is as follows:

| Chemical analysis | | |
|---|---|---|
| $SiO_2$ | % | 21.82 |
| $Al_2O_3$ | % | 5.54 |
| $Fe_2O_3$ | % | 0.81 |
| CaO | % | 63.89 |
| MgO | % | 0.87 |
| $SO_3$ | % | 5.53 |
| $Na_2O$ | % | 0.56 |
| $K_2O$ | % | 0.47 |
| $TiO_2$ | % | 0.16 |
| $P_2O_5$ | % | 0.04 |
| $Mn_2O_3$ | % | 0.00 |
| $CaF_2$ | % | 0.53 |
| Free CaO | % | 1.23 |
| Control moduli | | |
| LSF | | 93.8 |
| SM | | 3.5 |
| AM | | 6.8 |

After having confirmed, by the X-ray diffraction technique, the stabilization of the calcium sulfoaluminate in the clinker, the potential phases of the latter are calculated using the Bogue equations, which gives the following results:

| Phase | Unit | Value |
|---|---|---|
| Alite | % | 40 |
| Belite | % | 32 |
| Calcium sulfoaluminate | % | 10 |
| Calcium aluminate | % | 1 |
| Calcium aluminoferrite | % | 3 |
| Anhydrite | % | 7 |
| Free lime | % | 1 |

COMMENT: The $C_3A$ and $C_4A_3\overline{S}$ phases are distinguished by X-ray diffraction, which explains that the aluminum taken into account in calculating the potential phases of the $C_4A_3\overline{S}$ and $C_4AF$ is free after formation of the $C_3A$ quantified by the Rietveld method (by X-ray diffraction).

The clinker obtained made it possible, on the industrial level in a ball mill, to produce the cement with 6.4% $SO_3$, determined as optimum for obtaining strengths, with 96% passing the d 325 sieve and a surface of 4570 $cm^2/g$, defined by the Blaine method.

The following compressive strengths were obtained in the mortar:

| Compressive strength on 2" mortar cubes | | |
|---|---|---|
| Water/cement ratio | | 0.485 |
| 24 H | $N/mm^2$ | 23.8 |
| 3 D | $N/mm^2$ | 34.9 |
| 7 D | $N/mm^2$ | 42.9 |
| 28 D | $N/mm^2$ | |

Example 3

A clinker is sintered in the laboratory using 75.7% limestone, 17.5% waste material rich in $Al_2O_3$ and the components which promote the phases of the clinker at low temperature; the material obtained exhibits the following chemical composition:

| Chemical analysis | | |
|---|---|---|
| $SiO_2$ | % | 20.46 |
| $Al_2O_3$ | % | 7.28 |
| $Fe_2O_3$ | % | 0.89 |
| CaO | % | 63.68 |
| MgO | % | 0.52 |
| $SO_3$ | % | 7.25 |
| $Na_2O$ | % | 0.41 |
| $K_2O$ | % | 0.72 |
| $TiO_2$ | % | 0.33 |
| $P_2O_5$ | % | 0.13 |
| $Mn_2O_3$ | % | 0.03 |
| $CaF_2$ | % | 0.52 |
| Free CaO | % | 1.01 |
| Control moduli | | |
| LSF | | 95.8 |
| SM | | 2.5 |
| AM | | 8.2 |

The analysis of the clinker by the X-ray diffraction technique confirms that virtually all the aluminum is combined with the formation of the calcium sulfoaluminate and that there is no formation of $C_3A$ but only of $C_4AF$, which is stabilized due to the content of $Fe_2O_3$ present in the raw meal. The mineralogical composition of the resulting clinker is as follows:

| Phase | Unit | Value |
|---|---|---|
| Alite | % | 33 |
| Belite | % | 34 |
| Calcium sulfoaluminate | % | 13 |
| Calcium aluminate | % | 1 |
| Calcium aluminoferrite | % | 3 |
| Anhydrite | % | 9 |
| Free lime | % | 1 |

COMMENT: The $C_3A$ and $C_4A_3\bar{S}$ phases are distinguished by X-ray diffraction, which explains that the aluminum taken into account in calculating the potential phases of the $C_4A_3\bar{S}$ and $C_4AF$ is free after formation of the $C_3A$ quantified by the Rietveld method (by X-ray diffraction).

The compressive strengths on 2" mortar cubes after 24 h made it possible to determine that the optimum $SO_3$ content is 9% for this clinker and to obtain the following compressive strengths:

| Compressive strength on 2" mortar cubes | | |
|---|---|---|
| Water/cement ratio | | 0.485 |
| 16 H | $N/mm^2$ | 21.2 |
| 24 H | $N/mm^2$ | 26.0 |
| 3 D | $N/mm^2$ | 41.8 |
| 7 D | $N/mm^2$ | 47.9 |
| 28 D | $N/mm^2$ | 54.5 |

Example 4

Figure 3:
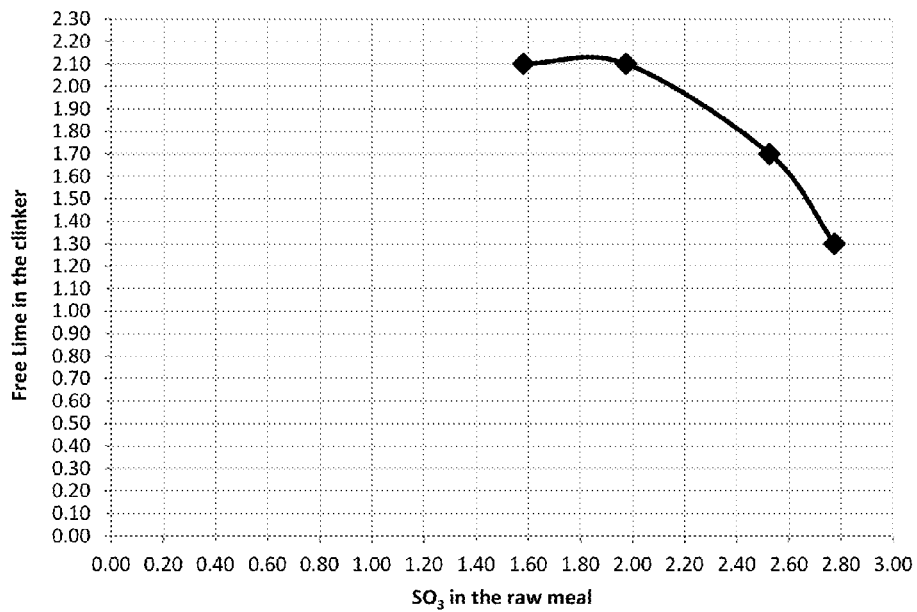
FIG. 3 shows the measured concentration of free lime in the clinker (CaO) (T=1300° C.; LSF=98.5) as a function of the $SO_3$ concentration in the raw meal.

Relationship between the $SO_3$ in the Raw Meal and the Free Lime in the Clinker The free lime CaO is maintained at high levels, above 2%, as long as the $SO_3$ content of the raw meal does not exceed a certain threshold. When the $SO_3$ content of the raw meal reaches the levels recommended according to the formula (A) of the invention as a function of the iron and alumina contents (in this case 2.8%), the level of free lime in the clinker reaches acceptable values, as illustrated by FIG. 3.

| | Composition of the raw meal | | | | | |
|---|---|---|---|---|---|---|
| $Al_2O_3$ | | % | | | 4.9 | |
| $Fe_2O_3$ | | % | | | 2.3 | |
| $SO_3$ according to equation (A) | | % | | | 2.8 | |
| | % by wt. | Clinker 4A | Clinker 4B | Clinker 4C | Clinker 4D |
| $SO_3$ raw meal | % | 1.6 | 2.0 | 2.5 | 2.8 |
| Free lime in the clinker | % | 2.1 | 2.1 | 1.7 | 1.3 |
| $C_4A_3\bar{S}$ in the clinker | % | 2.0 | 4.1 | 5.4 | 5.8 |

Example 5

Relationship between the $SO_3$ in the Raw Meal and the Content of Sulfoaluminates of the Clinker It is found that the $C_4A_3S$ level which is stabilized in the clinker is also a function of the $SO_3$ content of the raw meal and that contents of greater than 7.5% are obtained with the recommended level of $SO_3$ in the raw meal according to the equation (A), as illustrated by FIG. 4.

|  |  | Composition of the raw meal |  |  |  |
|---|---|---|---|---|---|
|  | $Al_2O_3$ | % |  | 4.9 |  |
|  | $Fe_2O_3$ | % |  | 2.3 |  |
|  | $SO_3$ according to (A) | % |  | 2.8 |  |
|  | % by wt. | Clinker 5A | Clinker 5B | Clinker 5C | Clinker 5D |
| $SO_3$ raw meal | % | 1.5 | 1.9 | 2.3 | 3.1 |
| Free lime in the clinker | % | 1.7 | 1.4 | 1.2 | 1.2 |
| $C_4A_3S$ in the clinker | % | 3.5 | 5.6 | 7.0 | 7.9 |

The invention claimed is:

1. A process for the manufacture of a clinker for cement, comprising grinding a raw meal comprising $Al_2O_3$, $Fe_2O_3$, and $SO_3$ in contents such that the formula for calculating $SO_3$ content is $SO_3 = 0.261 \times Al_2O_3 - 0.638 \times Fe_2O_3 + k$, where $2.5 \leq k \leq 3.5$, and sintering said raw meal in a kiln where temperature is between 1250° C. and 1350° C. and where the oxygen content in the kiln is between 2.5% and 10% by volume, wherein the $Al_2O_3$ content is between 3.0% and 10% by weight and the $Fe_2O_3$ content is between 0.5% and 2.0% by weight.

2. The process as claimed in claim 1, wherein the oxygen content in the kiln is between 4% and 8% by volume.

3. A clinker composition, comprising:
from 30% to 70% by weight of alite ($C_3S$),
from 10% to 40% by weight of belite ($C_2S$),
from 5% to 15% by weight of calcium sulfoaluminate ($C_4A_3S$),
from 1% to 7Z % by weight of ferrite ($C_4AF$),
from 3% to 10% by weight of anhydrite (CS), and
the remainder being composite of lime and/or of $C_3A$.

4. The composition as claimed in claim 3, further comprising from 0.1% to 1.5% by weight of fluorite ($CaF_2$).

5. The composition as claimed in claim 4, wherein said composition comprises from 0.2% to 1% by weight of fluorite ($CaF_2$).

* * * * *